US010695244B2

(12) United States Patent
Shimada et al.

(10) Patent No.: US 10,695,244 B2
(45) Date of Patent: Jun. 30, 2020

(54) BED APPARATUS

(71) Applicants: PARAMOUNT BED CO., LTD., Tokyo (JP); AICHI ELECTRIC CO., LTD., Aichi (JP)

(72) Inventors: Tatsuya Shimada, Tokyo (JP); Eita Hirai, Tokyo (JP); Yuji Hosokawa, Tokyo (JP); Dan Kageyama, Tokyo (JP); Shinnosuke Kubota, Tokyo (JP); Hirofumi Nagae, Aichi (JP)

(73) Assignee: PARAMOUNT BED CO., LTD., Tokyo (JP)

( * ) Notice: Subject to any disclaimer, the term of this patent is extended or adjusted under 35 U.S.C. 154(b) by 243 days.

(21) Appl. No.: 14/785,671

(22) PCT Filed: Apr. 23, 2014

(86) PCT No.: PCT/JP2014/061450
§ 371 (c)(1),
(2) Date: Oct. 20, 2015

(87) PCT Pub. No.: WO2014/175340
PCT Pub. Date: Oct. 30, 2014

(65) Prior Publication Data
US 2016/0067127 A1 Mar. 10, 2016

(30) Foreign Application Priority Data
Apr. 23, 2013 (JP) ................................. 2013-090467

(51) Int. Cl.
A61G 7/012 (2006.01)
A47C 19/04 (2006.01)
(Continued)

(52) U.S. Cl.
CPC ............ *A61G 7/012* (2013.01); *A47C 19/045* (2013.01); *A47C 20/041* (2013.01); *A61G 7/005* (2013.01);
(Continued)

(58) Field of Classification Search
CPC ........ A61G 7/012; A61G 7/005; A61G 7/015; A61G 7/018; A61G 2203/40; A61G 2203/42; A47C 19/045; A47C 20/041
See application file for complete search history.

(56) References Cited

U.S. PATENT DOCUMENTS 6,236,905 B1 * 5/2001 Whitmarsh ............... A61G 3/06
700/217
7,003,828 B2 * 2/2006 Roussy ................ A47C 19/045
5/600
(Continued)

FOREIGN PATENT DOCUMENTS

EP  1 346 666 A1  9/2003
JP  2001-057790 A  2/2001
(Continued)

OTHER PUBLICATIONS

International Search Report for corresponding International Application No. PCT/JP2014/061450 dated May 27, 2014.
(Continued)

*Primary Examiner* — Nicholas F Polito
*Assistant Examiner* — Amanda L Bailey
(74) *Attorney, Agent, or Firm* — Renner, Otto, Boisselle & Sklar, LLP

(57) ABSTRACT

A bed apparatus including, at least, two drivers or a first driver and a second driver, the first driver being in linkage with the second driver, comprises: a calculating means for calculating a calculated bed state value, based on the first driver and the second driver; an error detecting means for
(Continued)

detecting error between the calculated bed state value and a designated bed state value designated by the user; and, an error correcting means for correcting the detected error when an error is detected by the error detecting means. As a result, it is possible to provide a bed apparatus that can coincide the designated state of the bed apparatus with the actual state of the bed apparatus by appropriately correcting the error between the drivers.

10 Claims, 14 Drawing Sheets

(51) Int. Cl.
*A47C 20/04* (2006.01)
*A61G 7/018* (2006.01)
*A61G 7/005* (2006.01)
*A61G 7/015* (2006.01)
*G05B 15/02* (2006.01)

(52) U.S. Cl.
CPC ............ *A61G 7/015* (2013.01); *A61G 7/018* (2013.01); *A61G 2203/40* (2013.01); *A61G 2203/42* (2013.01); *G05B 15/02* (2013.01)

(56) References Cited

U.S. PATENT DOCUMENTS

| | | | | |
|---|---|---|---|---|
| 7,520,006 | B2* | 4/2009 | Menkedick | 5/600 |
| 8,959,681 | B2* | 2/2015 | Richards | A61G 7/00 340/540 |
| 2004/0010851 | A1 | 1/2004 | Nagaoka et al. | |
| 2005/0273933 | A1 | 12/2005 | Nagaoka et al. | |
| 2005/0283911 | A1 | 12/2005 | Roussy | |
| 2006/0028350 | A1 | 2/2006 | Bhai | |
| 2007/0157385 | A1* | 7/2007 | Lemire | A61G 7/005 5/600 |
| 2009/0031498 | A1* | 2/2009 | Girard | A61G 7/015 5/617 |
| 2010/0125953 | A1 | 5/2010 | Nagaoka et al. | |
| 2010/0257671 | A1 | 10/2010 | Shimada et al. | |
| 2011/0083271 | A1 | 4/2011 | Bhai | |
| 2011/0112442 | A1 | 5/2011 | Merger et al. | |

FOREIGN PATENT DOCUMENTS

| | | |
|---|---|---|
| JP | 2003-265270 A | 9/2003 |
| JP | 2009-207642 A | 9/2009 |
| JP | 2011-078781 A | 4/2011 |
| WO | WO 2004/021952 A1 | 3/2004 |

OTHER PUBLICATIONS

International Preliminary Report on Patentability for corresponding International Application No. PCT/JP2014/061450 dated Oct. 27, 2015 (English translation).

Extended European Search Report dated Apr. 12, 2017 for corresponding European Application No. 14787658.5.

* cited by examiner

FIG. 5

| Item | Value |
|---|---|
| Back Bottom Angle | 5 0 |
| Head-side Height | 1 6 |
| Foot-side Height | 1 0 |

(a)

(b)

BED APPARATUS

TECHNICAL FIELD

The invention relates to a bed apparatus including, at least, two drivers, or a first driver and a second driver.

BACKGROUND ART

Disclosure of Invention

Conventionally, the beds used by users such as patients, caregivers and others can be categorized into two groups, the beds to be used for medical care in hospitals and the like (which will be referred to hereinbelow as hospital beds) and the beds to be used for nursing care at nursing facilities, home and the like (which will be referred to hereinbelow as nursing beds).

Differing from the hospital bed, the nursing bed needs to be compact and lightweight because of restrictions on the installation site. Further, for ease of transportation and setting, the nursing bed is usually composed of multiple parts so as to allow easy assembly and disassembly of the bed.

On the other hand, there have been technologies for allowing change of the height of the bed apparatus, i.e., lowering the bed in order to allow the user to move from the bed apparatus, and raising the bed in order to allow the caregiver to readily give nursing care (see Patent Document 1, for example).

PRIOR ART DOCUMENTS

Patent Documents

Patent Document 1:
Japanese Patent Application Laid-open 2009-207642

SUMMARY OF THE INVENTION

Problems to be Solved by the Invention

Herein, when the height of the bed apparatus is changed, it is typical to use a drive unit. One example of the drive unit is configured to change the height of the bed apparatus by using an electric actuator and a linking mechanism connected to the electric actuator.

In the case of the bed apparatus, the drive unit receives a load depending on whether or not the user is residing in bed, the user's physique, position and the like. As a result, in some cases, there occurs a deviation between the instructed amount of movement to the drive unit (e.g., the height in the lift unit, the back raising angle in the back raising mechanism and the like) and the actual amount of movement. Though this deviation is small if error just occurs once, the amount of error becomes greater if many drive units are operated, posing trouble.

In particular, there has been developed a bed apparatus that can change the bed height at the head side and at the foot side, using two drive units (actuators). Changing the height at the head and foot sides enables the bed apparatus to tilt in the longitudinal direction. This produces the effect of reducing user's burden.

However, in the case of the bed apparatus of this kind, if the errors of the drive units on the head and foot sides arise diversely, there occurs the problem that the bed apparatus (i.e., the bed bottom) is tilted down on the head side (or on the foot side) due to height errors even if the bed apparatus is desired to be set flat.

In view of the above problems, it is therefore an object of the present invention to provide a bed apparatus which can make the designated state of the bed apparatus coincide with the actual state of the bed apparatus by appropriately correcting errors arising in its drive units.

Means for Solving the Problems

In order to solve the above problem, according to the bed apparatus of the present invention, a bed apparatus including, at least, two drivers or a first driver and a second driver, the first driver being in linkage with the second driver, comprises:

a calculating means for calculating a calculated bed state value, based on the first driver and the second driver;

an error detecting means for detecting error between the calculated bed state value and a designated bed state value designated by the user;

and, an error correcting means for correcting the detected error when an error is detected by the error detecting device.

Another bed apparatus of the present invention comprises:

a bottom lift, including a head-side lift unit having a first driver arranged close to the head side of the bed apparatus, and a foot-side lift unit having the second driver arranged close to the foot side of the bed apparatus; and, an error correcting means for detecting error of the bottom lift and correcting the detected error, wherein the error correcting means includes:

a head-side error detecting means for detecting an error between the designated height of the head-side lift unit and the actual height of the head-side lift unit; and, a foot-side error detecting means for detecting an error between the designated height of the foot-side lift unit and the actual height of the foot-side lift unit, and, when an error is detected by the head-side error detecting means and/or the foot-side error detecting means, the error correcting means corrects the error.

Effect of the Invention

According to the bed apparatus of the present invention, the first driver and the second driver are linked with each other. Based on the first driver and the second driver, a calculated bed state value is calculated so as to detect the difference between the calculated bed state value and the designated bed state value designated by the user. As a result, it is possible to appropriately correct error that arises when the first driver and the second driver operate in linkage with each other.

According to the present invention, the bed apparatus comprises: a bottom lift including a head-side lift unit having a first driver arranged close to the head side of the bed apparatus and a foot-side lift unit having the second driver arranged close to the foot side of the bed apparatus; and, an error correcting means for detecting error of the bottom lift and correcting the detected error. The error correcting means includes: a head-side error detecting means for detecting an error between the designated height of the head-side lift unit and the actual height of the head-side lift unit; and a foot-side error detecting means for detecting an error between the designated height of the foot-side lift unit and the actual height of the foot-side lift unit. When an error is detected by the head-side error detecting means and/or the foot-side error detecting means, the error correcting means corrects the error. As a result, in the bed in which the heights on the head foot sides are varied, the error between the head-side height and the foot-side height can be detected and corrected.

BRIEF DESCRIPTION OF DRAWINGS

FIG. 5 A chart for explaining one example of a state table in the present embodiment.

MODE FOR CARRYING OUT THE INVENTION

Next, the embodiments of the present invention will be described with reference to the accompanying drawings. The embodiments hereinbelow are to give explanation of necessary and sufficient states for illustration of the present invention, and are not intended to limit the details of the present invention.

1. Apparatus Outline

Figure 1:
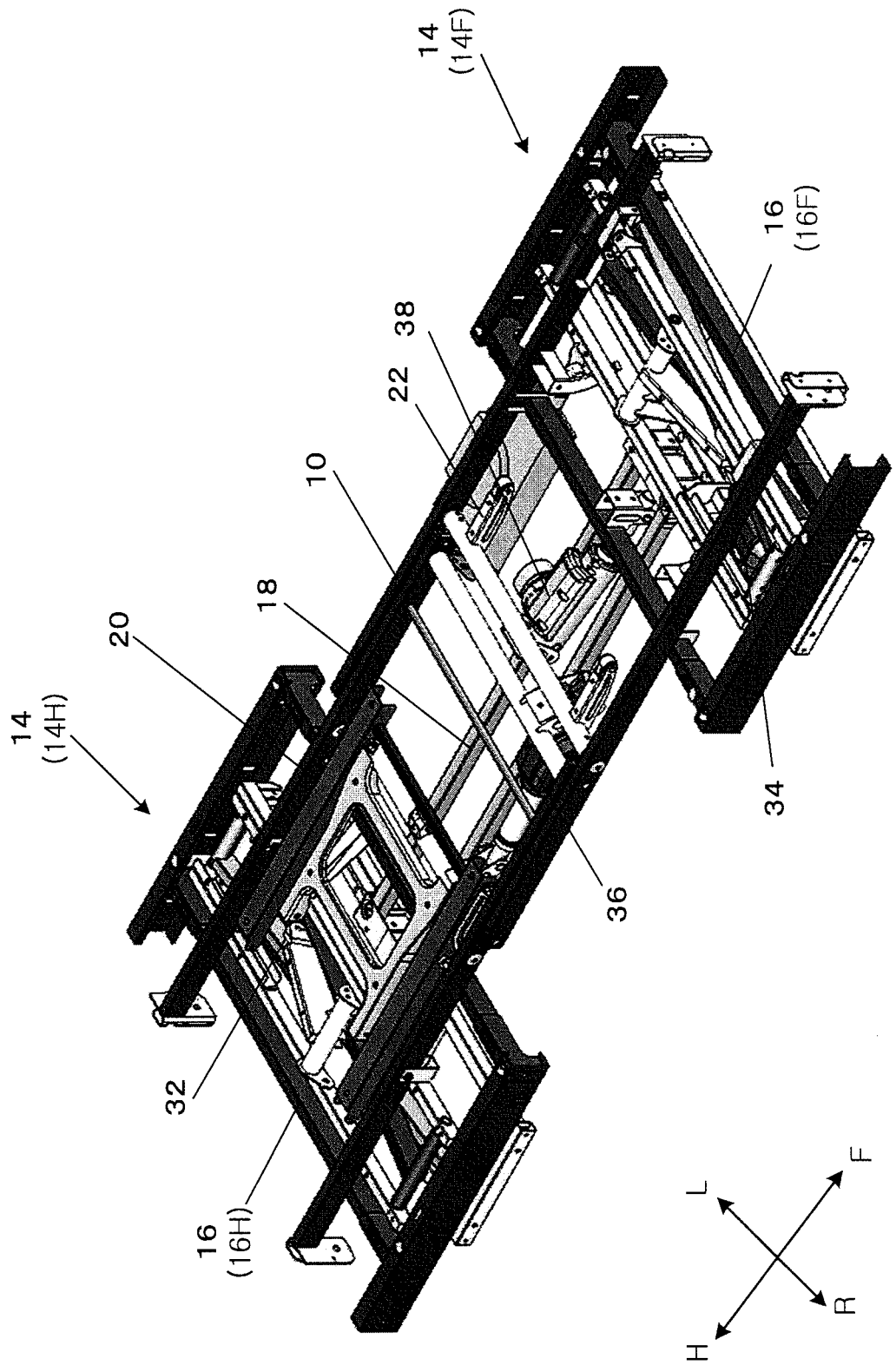
FIG. 1 A perspective view showing a bed apparatus (frame structure) in the present embodiment.

FIG. 1 is an overall perspective view of a frame on which bottoms are mounted in a bed apparatus according to the present invention.

In FIG. 1, in the bed apparatus, the head side to which the user's head is oriented when the user is lying is indicated by "H" and the foot side to which the user's feet are oriented when the user is lying is indicated by "F". The right-hand side (the left side of the bed apparatus when viewed from top) of the user when the user is lying supine is indicated by "R" and the opposite side or the left side (the right side of the bed apparatus when viewed from top) of the user when the user is lying supine is indicated by "L".

As shown in FIG. 1, the bed apparatus is essentially comprising: a top frame 10 having an approximate ladder structure with its length oriented along the direction from the head side end to the foot side end and its short side oriented in the width direction, a bottom (not shown) placed on the top frame 10; and lift units 14 (a head-side lift unit 14H and a foot-side lift unit 14F) that are arranged on the head and foot sides under the top frame 10, respectively, to support the top frame 10 so as to be raised and lowered relative to the floor.

Approximately rectangular support frames 16 (a support frame 16H for the lift unit 14H and a support frame 16F for the lift unit 14F), longer in the width direction of the bed apparatus, are fixed at the head side and foot side to the underside of the top frame, in order to set the top frame on top of the lift units 14H and 14F.

The lower ends of the lift units 14H and 14F are detachably connected to each other by a connecting frame 18. The connecting frame 18 has a paired pipe frame structure, which is arranged with its length oriented to the head and foot sides.

The lift units 14H and 14F each include a drive unit (e.g., an actuator), so that the drive force of each actuator is controlled separately. Drive control of each actuator makes it possible to perform a tilting operation of producing height difference between the head side and foot side of the top frame 10.

Figure 2:
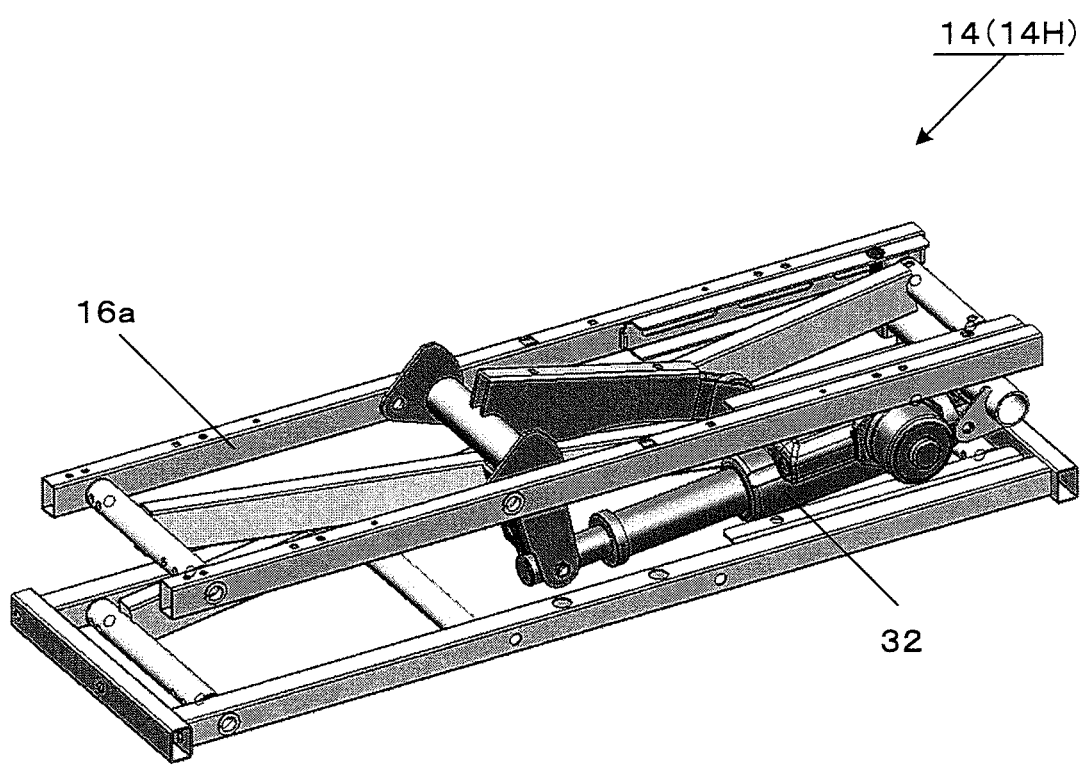
FIG. 2 A perspective view showing a lift unit in the present embodiment.

FIG. 2 shows a perspective view of an example of the lift unit 14H. The lift unit 14H is equipped with an actuator 32, to which a linking mechanism is connected. As the actuator 32 operates, the support frame 16H in FIG. 1 set on a frame 16a is raised by the connected linking mechanism. As a result, the top frame 10 coupled with the support frame 16H moves up. As to the lift unit 14F, an actuator 34 is provided so as to achieve similar operation.

The top frame 10 is also equipped with a back-raising linkage 20 on the head side and a knee-raising linkage 22 around the center. Further, drive units for driving these linkages are also provided. In the present embodiment, actuators are coupled with the linking mechanisms so that back-raising and knee-raising (feet-lowering) operations are performed by actuators via the linking mechanisms. For example, an actuator 36 is used for back rise and an actuator 38 is used for knee rise.

A back-raising operation can be achieved by actuating a back raising rod with the bottom mounted on the top frame, whereas a knee-raising operation can be achieved by actuating a knee raising rod.

2. Functional Configuration

Figure 3:
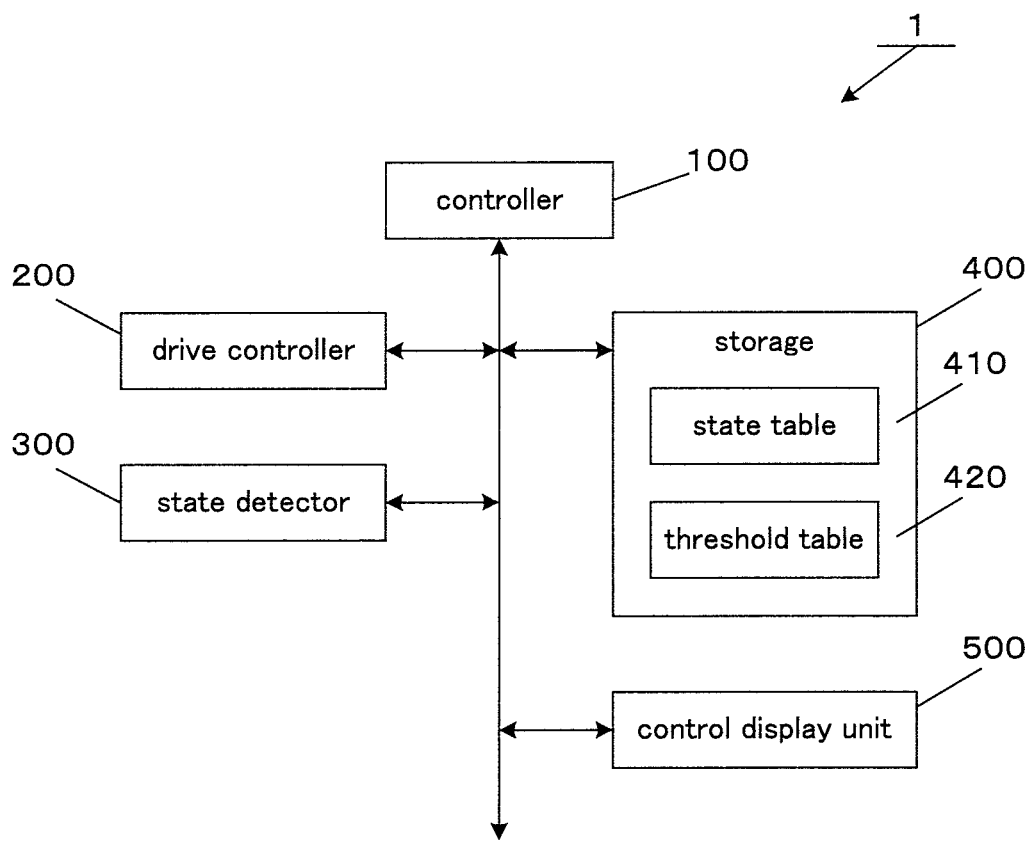
FIG. 3 A diagram for explaining a functional configuration of a bed apparatus in the present embodiment.

Next, the functional configuration of the bed apparatus in the present embodiment will be described using drawings. FIG. 3 is a diagram for explaining the outline of the functional configuration of the bed apparatus.

The bed apparatus includes a controller 100 to which a drive controller 200, a state detector 300, a storage 400 and an operation display portion 500 are connected.

The controller 100 is a functional unit for controlling the bed apparatus as a whole. The controller 100 reads out diverse programs stored in the storage 400 and executes the programs to implement various functions, and is formed of a CPU (Central Processing Unit) and the like.

The drive controller 200 is a functional unit for controlling the drivers (drive units, actuators in this embodiment) provided for the bed apparatus. The drive controller 200 is provided as, for example a control unit or the like.

Figure 4:
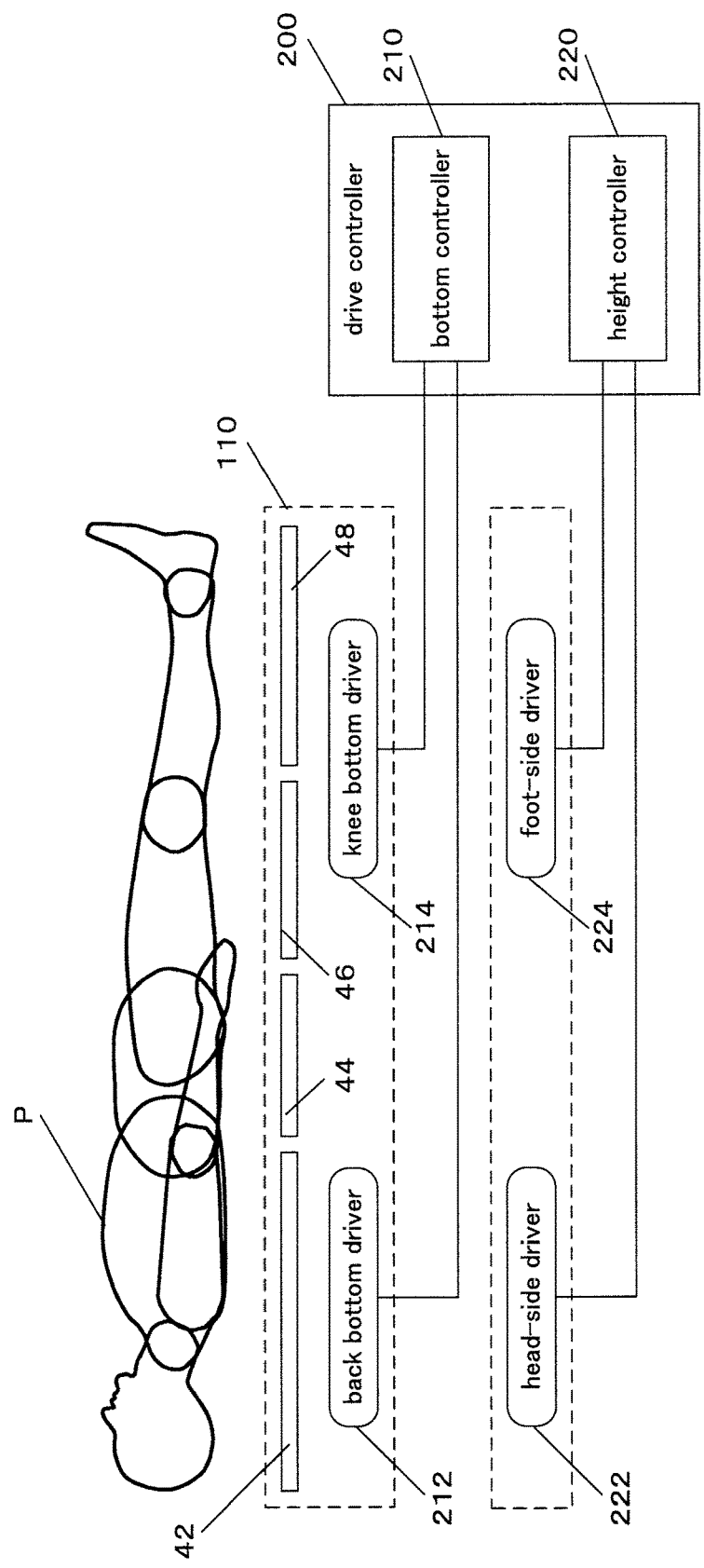
FIG. 4 A diagram for explaining a functional configuration of a bed apparatus in the present embodiment.

The drive controller 200 will be described referring to FIG. 4. As illustrated in FIG. 4, the drive controller 200 includes a bottom controller 210 for controlling back-raising, knee-raising (foot-lowering) and other functions and a height controller 220 for controlling the height of the bed apparatus.

In order to achieve the back-raising function, the bottom controller 210 is connected to a back bottom driver 212 and a knee bottom driver 214. The back bottom driver 212 is the actuator 36 in FIG. 1, which is connected to the back-raising linkage 20 via the linking mechanism. A back bottom 42 set on the linkage 20 is operated by control of the back bottom driver 212 to thereby perform back-raising and back-lowering control.

The knee bottom driver 214 is the actuator 38 in FIG. 1, which is connected to the knee-raising linkage 22 via the linking mechanism. A knee bottom 46 set on the linkage 22 and a foot bottom 48 coupled thereto are operated by control of the knee bottom driver 214 to thereby perform knee-raising and knee-lowering (foot-lowering and foot-raising) control.

That is, in the present embodiment, a head-side driver 222 is provided as the first driver and a foot-side driver 224 is provided as the second driver. The head-side driver 222 and the foot-side driver 224 operate in linkage with each other to cause the bed apparatus to move up and down and tilt.

The upper body of a user P is supported by the back bottom 42 and the hips are supported by a hip bottom 44. The knee bottom 46 abuts and supports the thighs of the user P to prevent the user P from moving in the foot-side direction F, for example.

The height controller 220 controls the bed height, and is connected to the head-side driver 222 and the foot-side driver 224. The head-side driver 222 is the actuator 32 in FIG. 1 to realize the raising/lowering function of the lift unit 14H. The foot-side driver 224 is the actuator 34 in FIG. 1, which realizes the raising/lowering function of the lift unit 14F. When the head-side driver 222 and the foot-side driver 224 are controlled by the same amount of control (in one word, the lift unit 14H and the lift unit 14F are set to the same height), the height of the bed apparatus can be changed while keeping the bed horizontal.

When the head-side driver 222 and the foot-side driver 224 are controlled by different amounts of control (in one word, the lift unit 14H and the lift unit 14F are set to different heights), a tilting operation of the bed apparatus can be realized so as to tilt the bed.

The state detector 300 is a functional unit for detecting the entire state of the bed apparatus. For example, the detector can detect the state of the bed apparatus (as to whether or not back-raising has been performed or not, and others), detect the current height of the bed apparatus and detect whether or not the user is currently staying on the bed apparatus.

It is also possible to detect bed state values as to the state of the bed apparatus. The bed state values are numerals representing the state of the bed apparatus. For example, various kinds of numerals as to bed such as the height difference between the head side and the foot side, the angles of back raising and knee raising and the angle of the top frame 10 relative to the floor (horizontal plane) can be detected.

A state detector 300 may perform detection by use of various sensors, or may perform detection based on the signals from the actuators. For example, to detect the back-raising angle, the correlation between the amount of operation of the actuator 36 (the extended amount of the rod) and the back-raising angle has been stored beforehand. With this, it is possible to detect the back-raising angle, achieved by the actuator 36, by detecting the current state of the actuator 36.

Further, the correlation between the amount of operation of the actuator 32 (34) and the lift unit 14H (14F) has been stored beforehand. With this, it is possible to detect the current height and tilt angle of the top frame 10.

Though, for description convenience, explanation herein will be made on the assumption that detection of various states is performed by the state detector 300, the controller 100 may perform all the detection.

The storage 400 is a functional unit that stores various kinds of data and various kinds of programs necessary for operations of the bed apparatus. The storage 400 is made up of, for example, semiconductor memories, HDDs (Hard Disk Drives) and the like. Further, the storage 400 also stores a state table 410 and a threshold table 420.

The state table 410 is a table that stores various states of the bed apparatus. FIG. 5 shows one example of the state table 410. As shown in FIG. 5, the back bottom angle (e.g., "50°") formed between the back bottom 42 and the top frame 10, the heights from the initial state at the lift units 14 are recorded.

As the heights of the lift units 14, the height of the lift unit 14H is recorded as the head-side height (e.g., "16") and the height of the lift units 14F is recorded as the foot-side height (e.g., "10"). Herein, the "height" in this embodiment is indicated by the measurement from the lowest position (the lowest state of the lift unit), which is set at "0". Other than this, the height from the floor, for example may be recorded.

Though, for description convenience, the states of the bed apparatus are stored in the form of the state table 410 in the present embodiment, it is not necessary to have the states of the bed apparatus recorded. That is, the states of the bed apparatus may be detected through the state detector 300 when required.

A threshold table 420 is a table stores various thresholds. The thresholds may have been stored beforehand, or may be designated by the user side. Alternatively, the thresholds may be designated based on the use environment when the bed apparatus is installed (set up). The thresholds to be stored will be explained as appropriate in the description of the processes.

Figure 6:
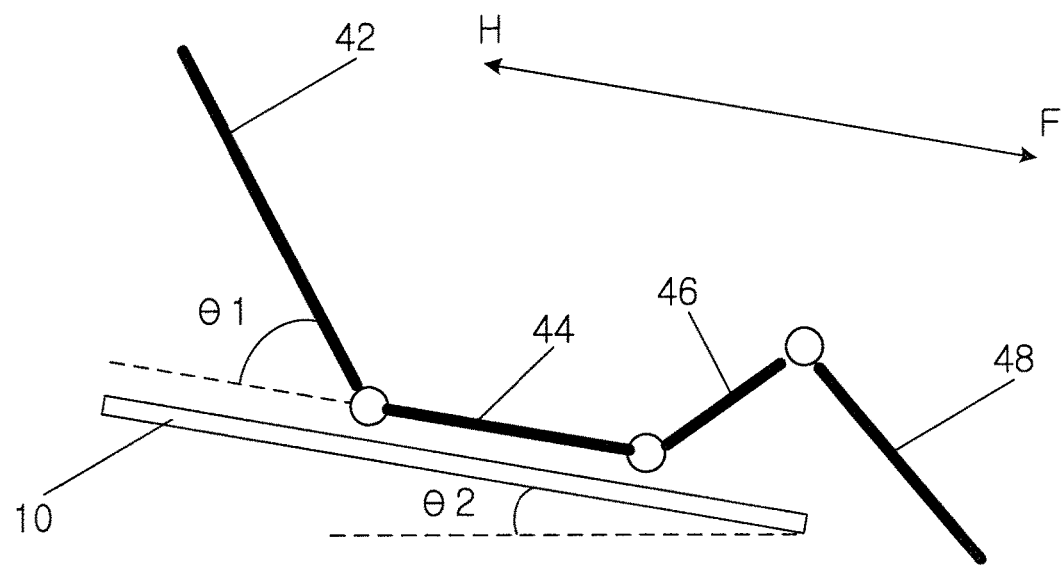
FIG. 6 A diagram for illustrating an operation in the present embodiment.
Figure 6:
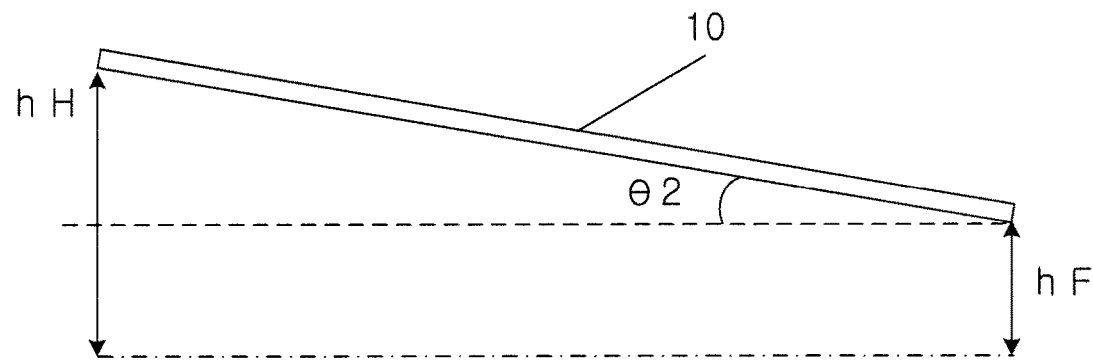

Referring now to FIG. 6, the angles referred to in the present embodiment will be described. In FIG. 6, the back bottom 42 is raised at an angle of θ1 from the top frame 10. This angle θ1 is the back bottom angle. The top frame 10 is inclined at an angle of θ2 to the horizontal. As a result, the bed apparatus is totally inclined (as the back-raised angle from the horizontal) at angle θ1+angle θ2.

In this case, the top frame 10 is positioned so that the height on the head side is raised by hH from the initial state and the height on the foot side is raised by hF from the initial state. From these heights, θ2, the inclined angle of the top frame can be calculated. For example, when the length of the top frame 10 is X, the angle θ2 can be determined by $\sin^{-1}((hH-hF)/X)$.

Since the user's back-raised angle is given as the angle θ1+the angle θ2, the total inclination (the back-raised angle from the horizontal) of the bed apparatus can be determined.

3. Examples

Next, examples in the present embodiment will be described using operation flows. The examples in the present embodiment are, for example a process that is applied to a case where when two or more drivers are operated, each driver operating individually. That is, the examples are to correct determined errors of bed state values when two or more drivers operate in linkage with one another.

3.1 The First Example

3.1.1 Actuating Process

Figure 7:
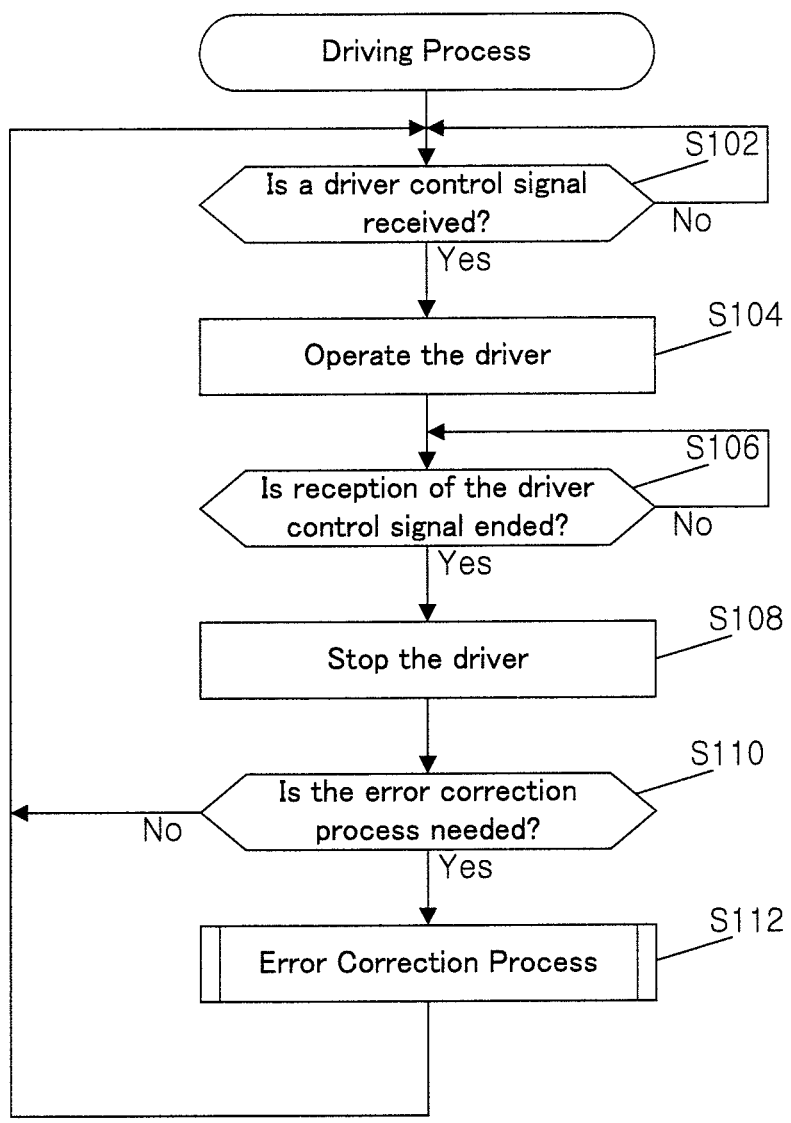
FIG. 7 A chart showing the operation flow of a driving process of the first example in the present embodiment.

Referring first to FIG. 7, description will made on a case where each operation (driving operation) of the bed apparatus is performed. For example, a driver control signal is received from the user (Step S102; Yes), the driver starts operating (Step S104).

Herein, the operation of a driver may be a control operation such as, for example a back-raising operation, knee-raising operation or the like, or may be a height adjustment of the bed apparatus (bottom portion). While a driver control signal is being received, the driver continues to operate. When reception of the driver control signal is ended (there is no input of the driver control signal), the driver stops (Step S106; Yes→Step S108).

That is, when the user performs an operation of raising the bed height, the head-side driver 222 and the foot-side driver 224 operate. Specifically, the rods of the actuators forming the drivers extend so as to raise the height of the bottom portion via the linking mechanisms.

Further, operations are performed not only by user control, but also in response to the control signals from the controller 100. For example, when the back-raising operation is selected by the user, the back bottom driver 212 operates first so that the back bottom 42 rotates and sets to the back-raised state. Then, as the back bottom 42 reaches a predetermined angle, the head-side driver 222 and the foot-side driver 224 are raised and lowered, respectively, to tilt the entire bottom.

Thus, the inclination of the back bottom 42 and the inclination of the whole bottom create the total back-raising angle.

Figure 8:
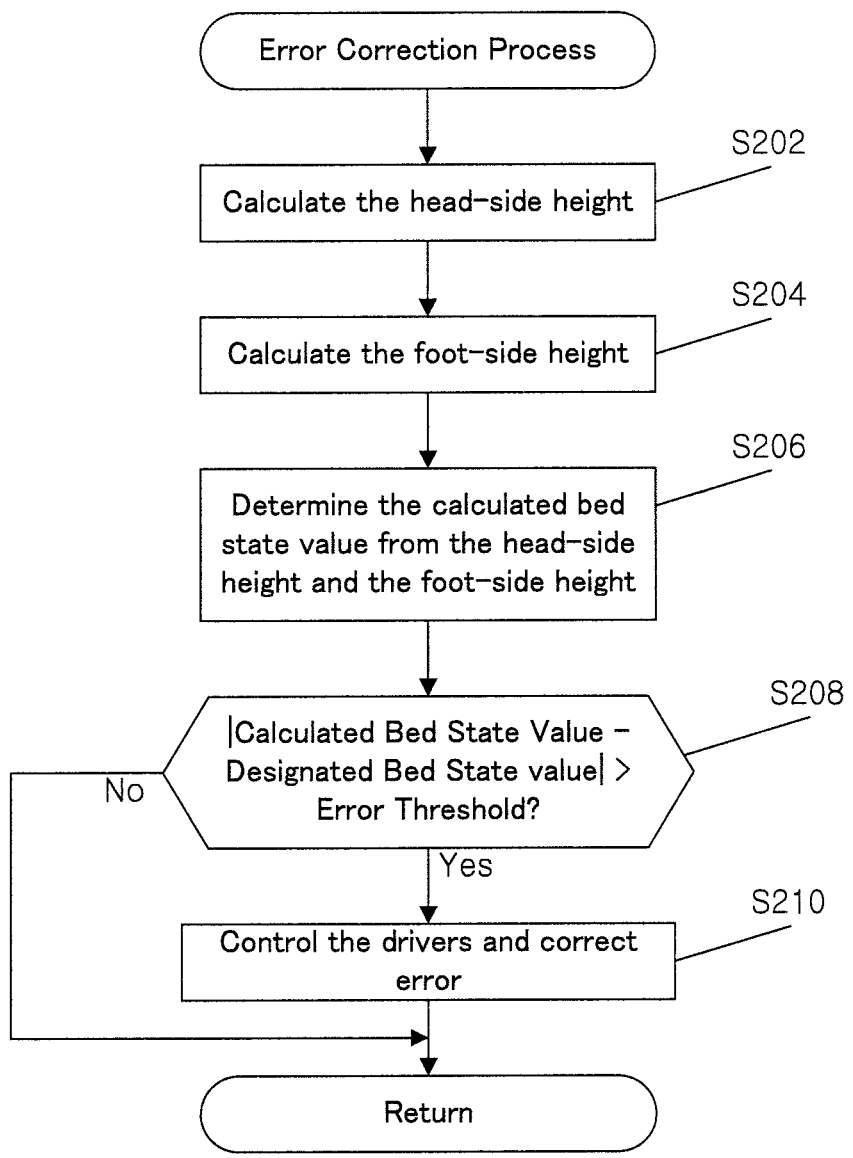
FIG. 8 A chart showing the operation flow of a process of error correction of the first example in the present embodiment.

After the drivers has stopped operation, it is determined whether or not an error correction process should be done (Step S110). When an error correction process is needed, the error correction process shown in FIG. 8 is executed (Step S110; Yes→Step S112).

Various times can be considered to perform the error correction process. For example, the process may be done when a driver has stopped operation and another drive starts operation, when the error exceeds the predetermined range, or when a driver falls into a predetermined state.

3.1.2 Error Correction Process (1)

Referring next to FIG. 8, the error correction process in the first example will be described. This error correction process is an exemplary process that is effected to correct error between the head-side driver 222 and the foot-side driver 224. That is, using the height difference between the head-side height and the foot-side height as the bed state values, the error of the height difference is corrected.

To begin with, the head-side height is calculated (Step S202). The head-side height is calculated from the value detected by head-side driver 222. The head-side height may be determined by calculation or by using a conversion table.

Next, the foot-side height is calculated (Step S204). The foot-side height is calculated from the value detected by foot-side driver 224. The foot-side height may be determined by calculation or by using a conversion table.

Subsequently, the calculated bed state value is determined from the height difference between the calculated head-side height and the calculated foot-side height (Step S206). Herein, the difference between the calculated head-side height and the calculated foot-side height is "0" when the bed apparatus (the top frame 10) is horizontal. When the bed apparatus is inclined at an angle of θ2 degrees, the difference can be calculated by the product of the length of the top frame 10 and sin θ2. Then, it is determined whether or not the absolute value of the difference between the calculated bed state value and the designated bed state value exceeds a predetermined error threshold (Step S208).

The error threshold is a previously set value that can be permitted as error. The error threshold is stored in the threshold table 420, for example. The error threshold does not need to be set beforehand. For example, the threshold may be designated in accordance with the environment at the time of setting up, or may be varied by the user. Alternatively, instead of a table, the error threshold may be described as a program.

Herein, when the difference between the calculated bed state value and the designated bed state value exceeds the error threshold (Step S208; Yes), the drivers are controlled so as to correct the error (Step S210).

Specifically, suppose that the current height difference designated by the user is "5 cm" and the error threshold is "0.3 cm". In this case, if the calculated bed state value is equal to or greater than "4.7 cm" and smaller than "5.3 cm", no error correction is performed. However, when the calculated bed state value falls out of the above range, the drivers are controlled so as to correct error, or make the height difference equal to "5 cm".

Though, in this example, the error is calculated based on the head-side height and the foot-side height, simply the amounts of extension of the rods of the actuators may be used, or the angle of the frame may be used. That is, as a result of operations of the two or more drivers (e.g., actuators) from the present invention reference values, errors from the reference values are detected and corrected.

3.1.3 Error Correction Process (2)

Figure 9:
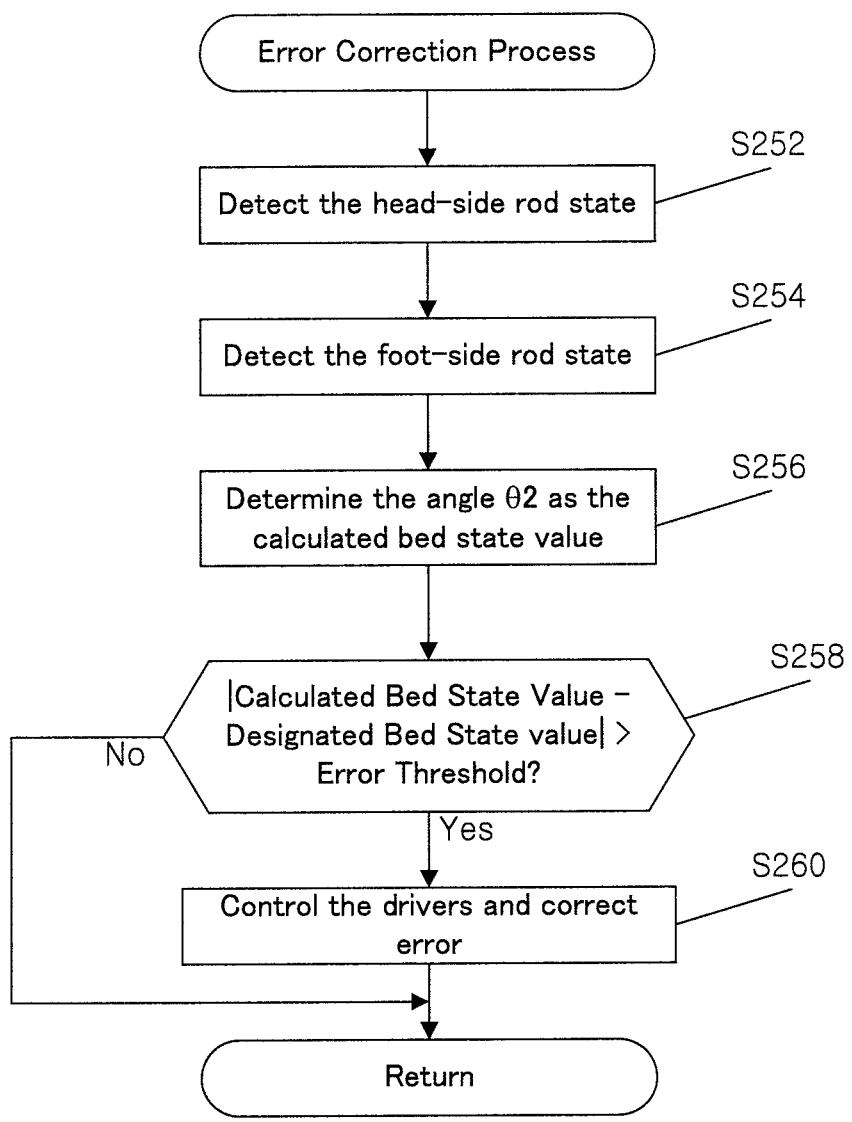
FIG. 9 A chart showing the operation flow of a process of error correction of the first example in the present embodiment.

Referring next to FIG. 9, an error correction process when angles are used as bed state values. First, the rod state on the head side is detected (Step S252) and the rod state on the foot side is detected (S254).

After the rod state on the head side and the rod state on the foot side are detected, an angle θ2 of the frame to the horizontal is calculated as a calculated bed state value, based on the detected rod states (Step S256). Herein, the angle θ2 may be determined from a conversion table, or may be calculated based on the rod states (calculation using trigonometric functions or others).

Herein, when the difference between the calculated bed state value thus determined and the designated bed state value is equal to or greater than the error threshold, a driver is controlled to correct error (Step S258; Yes→Step S260). In order to achieve the designated bed state, for example the rod on the head side (the rod on the foot side) as the drivers to be controlled is actuated to make the angle fall within the range defined by the error threshold and thereby correct the error.

3.2 The Second Example

Next, the second example will be described. The second example will be described taking a case where diverse states of the bed apparatus have been stored in the state table 410, and the operation is performed based on the stored states.

Figure 10:
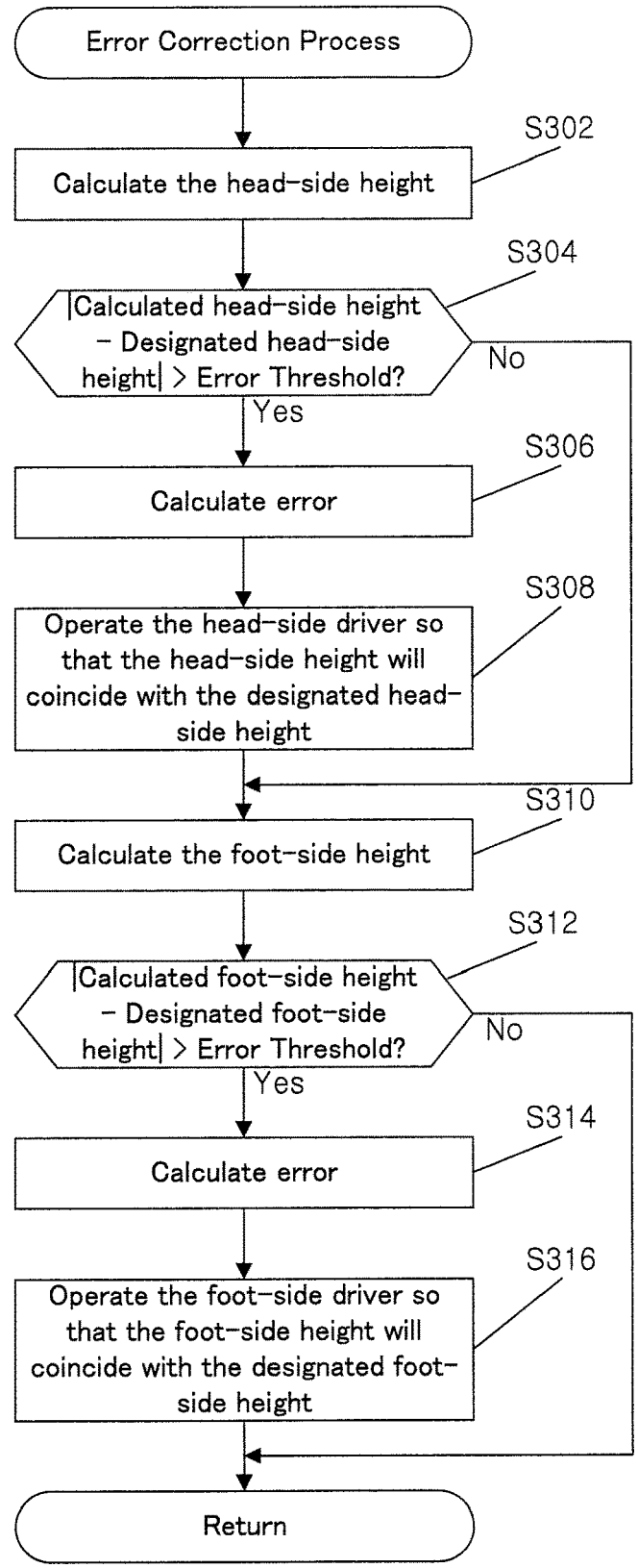
FIG. 10 A chart showing the operation flow of a process of error correction of the second example in the present embodiment.

Herein, the process of operating the drivers for the bottom's position and height in the bed apparatus is performed in the same manner as in FIG. 7 for the first example. The error correction process in this example will be described referring to FIG. 10.

While the lift unit 14H and the lift unit 14F repeatedly are moved up and down, the actual height deviates from the height being stored in the state table 410 (i.e., the designated height). That is, the heights of the individual lift units are used as the bed state values. The error correction process is aimed at correcting this deviation.

3.2.1 Error Correction Process

First, the head-side height is calculated (Step S302). The head-side height is calculated based on the sensor value detected by the state detector 300. The sensor value to be detected may be based on the value output from the actuator, or may be detected by providing a height sensor.

Next, the absolute value of the difference between the actual head-side height (the calculated head-side value) calculated at Step S302 and the head-side height stored in the state table 410 (the designated head-side height) is determined. Then, it is determined whether or not this absolute value exceeds an error threshold (Step S304).

When the absolute value of the difference between the calculated head-side value and the designated head-side height exceeds the error threshold (Step S304; Yes), the specific error is calculated (Step S306). Then, in order to correct the calculated error, the head-side driver 222 is operated so that the actual head-side height will coincide with the designated head-side value (Step S308).

Correcting error herein is to perform adjustment so as to make the absolute value of the difference between the calculated head-side height and the designated head-side height null or fall within a permissible range.

Similarly, error correction is also performed for the foot side. First, the foot-side height is calculated (Step S310), then the absolute value of the difference between the foot-side height (the calculated foot-side value) calculated at Step S310 and the foot-side height stored in the state table 410 (the designated foot-side height) is determined. Thereafter, it is determined whether or not this absolute value exceeds the error threshold (Step S312).

When the absolute value of the difference between the calculated foot-side value and the designated foot-side height exceeds the error threshold (Step S312; Yes), the specific error is calculated (Step S314). Then, in order to correct the calculated error, the foot-side driver 224 is operated so that the actual foot-side height will coincide with the designated foot-side value (Step S316).

Correcting error herein is to perform adjustment so as to make the absolute value of the difference between the calculated foot-side height and the designated foot-side height null or fall within a permissible range.

As the errors of the head-side height and the foot-side height are corrected in the above way, the height designated in the state table 410 (e.g., the height of the top frame 10 supported by the back-raising function) coincides the height of the bed apparatus actually used by the user.

3.2.2 Applied Processes

Referring next to drawings, description will be made on process examples in which the error correction process of the second example is performed.

3.2.2.1 The First Process Example

Figure 11:
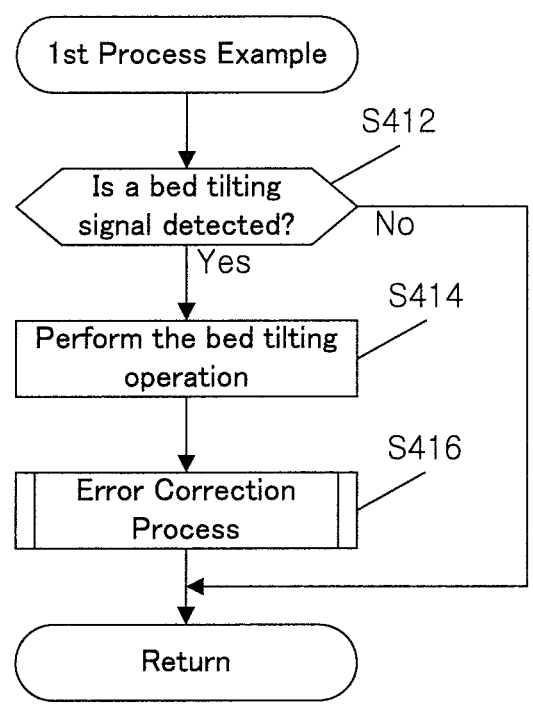
FIG. 11 A chart showing the operation flow of a first processing example in the present embodiment.

Referring first to FIG. 11, as the first process example, description will be made on a process example in which the error correction process is performed when the bed is tilted.

First, a bed tilting signal is detected (Step S412; Yes). As the bed tilting signal is detected, the bed tilting operation is performed (Step S414). At this time, the error correction process is effected at the timing when the bed tilting operation ends (Step S416).

According to the first process example, since the error correction process is performed every time the bed is tilted, the error can be corrected before it becomes too large, hence it is possible to always perform correct setting of the height.

3.2.2.2 The Second Process Example

Figure 12:
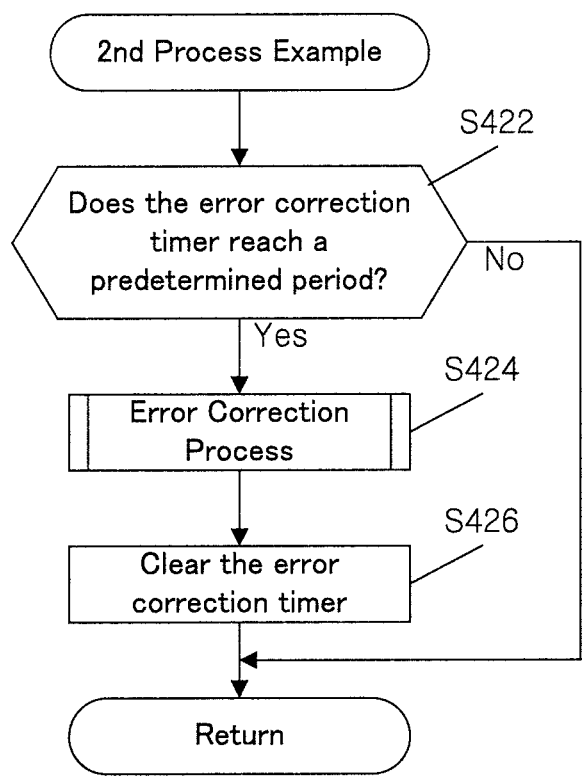
FIG. 12 A chart showing the operation flow of a second processing example in the present embodiment.

Referring next to FIG. 12, as the second process example, description will be made on a process example in which the error correction process is performed by timer interrupts after lapse of a predetermined period of time.

In this process example, time is separately counted by an error correction timer set up with predetermined period of time. When the error correction timer reaches the predetermined period of time (Step S422; Yes), the error correction process is effected (Step S424). As the error correction process has been completed, the error correction timer is cleared (Step S426), and the error correction process is effected again after lapse of the predetermined period of time.

In the above way, according to the second process example, since the error correction process is performed every predetermined period of time, this configuration is effective in reducing power consumption compared to the case where the error correction is performed each time, for example. Though in this process example, error correction is performed every predetermined period of time, error correction may be performed at a fixed time. For example, if the bed apparatus is not used at 6 p.m. for a meal, the error correction process may be adapted to be performed at 6 p.m.

3.2.2.3 The Third Process Example

Figure 13:
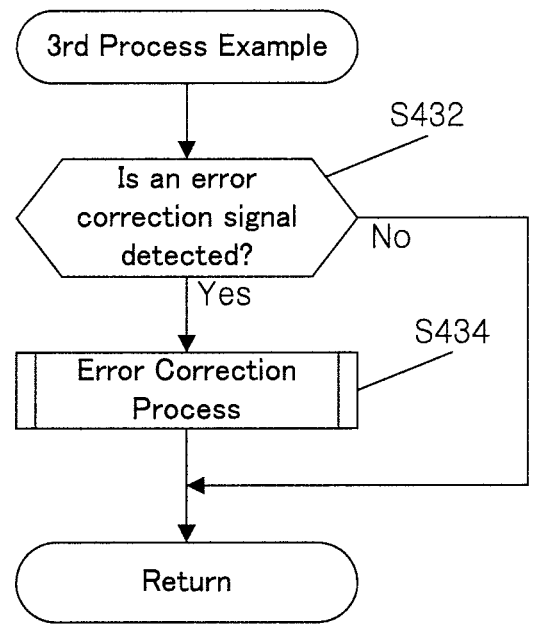
FIG. 13 A chart showing the operation flow of a third processing example in the present embodiment.

Referring next to FIG. 13, as the third process example, description will be made on a process example in which the error correction process is performed when an operation of error correction is indicated by the caregiver (the user).

In this process example, when an error correcting signal is detected (Step S432; Yes), the error correction process is performed (Step S434). Thereby, it is possible to perform the error correction process at a time the caregiver wants to.

3.2.2.4 The Fourth Process Example

Figure 14:
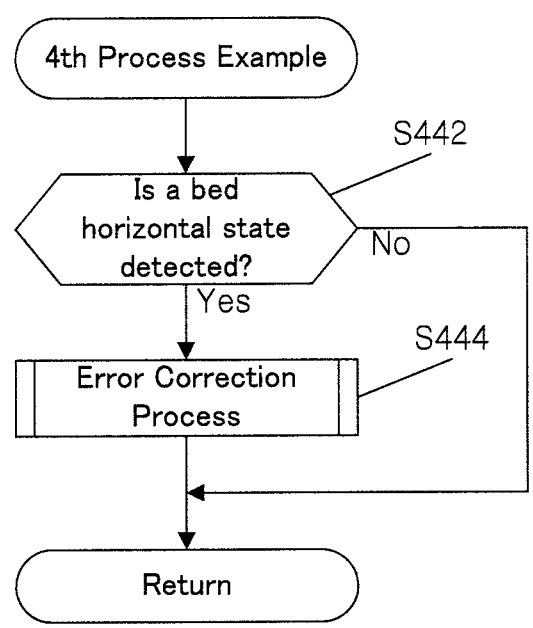
FIG. 14 A chart showing the operation flow of a fourth processing example in the present embodiment.

Referring next to FIG. 14, as the fourth process example, description will be made on a process example in which the error correction process is performed when bed apparatus is set in a horizontal state or in a state close to the initial state.

In this process example, when the bed apparatus is detected to be set in a horizontal state (e.g., when the back-raised angle is 0 degrees and the difference between the head-side height and the foot-side height is 0) (Step S442; Yes), the error correction process is performed (Step S444).

In this way, since the bed apparatus is in a horizontal state hence in a state close to the initial state, it is possible to pertinently calculate errors and perform correction. Further, the error correction process may be performed only when the user is not detected in the bed apparatus.

4. Variational Examples

Though the embodied modes of the present invention have been described with reference to the drawings, the specific configuration should not be limited to the embodiment. Designs and others that do not depart from the gist of this invention should also be included in the scope of claims.

Further, the first to fourth process examples have been explained as the specific process examples. These process examples are examples explaining the timing of performing the error correction process. Therefore, for example a plurality of the process examples may be combined in the products.

Further, in the above embodiment, two drivers (actuators) and linkages are provided on the head side and foot side to realize lift units. However, other methods may be used. That is, as long as the heights on the head side and the foot side can be separately set up, two or more actuators may be provided and lifting may be effected without use of any linkage.

Though electric actuators are exemplified as the drivers, it goes without saying that hydraulic actuators, hydraulic pumps and other means may be used.

The error correction process herein is performed based on the angles created by the lift units. However, the error correction process may be performed based on, for example the back-raised angle (the angle of the back bottom from the horizontal state). That is, when only the back-raised angle is stored without memory of the heights of the lift units 14, the error between the actual back-raised angle and the designated back-raised angle is calculated.

Then, when the error exceeds the predetermined permissible range, the actual back-raised angle is corrected (modified) to perform error correction.

Further, the above embodiment was described assuming the head-side driver 222 to be the first driver and the foot-side driver 224 to be the second driver. That is, description was made on the case where the head-side driver 222 and the foot-side driver 224 cooperate in linkage with each other. However, as long as error is detected when multiple drivers are driven in cooperation, the invention may be applied to any other configurations.

For example, when two actuators (drivers) are provided for the back-raising mechanism to cooperate with each other and realize back raising and back lowering, it is possible to provide a configuration in which the error between the two actuators is detected and corrected.

Further, in a case of a bed apparatus where an actuator (driver) is provided for each of the back bottom, knee bottom and foot bottom, and the three drivers are driven cooperatively to change the bottom state, errors of the three drivers may be detected and corrected.

DESCRIPTION OF REFERENCE NUMERALS

10 top frame
14, 14H, 14F lift unit
16, 16H, 16F support frame
18 connecting frame
20, 22 linkage
32, 34, 36, 38 actuator
42 back bottom
44 hip bottom
46 knee bottom
48 foot bottom
100 controller
  200 drive controller
    210 bottom controller
      212 back bottom driver
      214 knee bottom driver
    220 height controller
      222 head-side driver
      224 foot-side driver
  300 state detector
  400 storage
    410 state table
    420 threshold table
  500 operation display portion

The invention claimed is:

1. A bed apparatus comprising:
a lift configured to support a top frame and to raise and lower the top frame, comprising:
   a head-side lift unit having a first driver arranged to a head side of the bed apparatus; and
   a foot-side lift unit having a second driver arranged to a foot side of the bed apparatus,
a bottom driver configured to raise a back bottom segment that is placed on the top frame to raise a back of a user;
a state detector configured to calculate a height difference between a height of the head-side lift unit and a height of the foot-side lift unit, as a calculated bed state value;
an error correcting portion configured to detect that there is an error when the calculated bed state value exceeds an error threshold as a value that can be permitted as an error, and configured to correct the error by controlling the first driver and/or the second driver in a first timing, the first timing being when the bottom driver is restarted after stopping the bottom driver; and
a controller configured, in response to a tilt and back-raising command, to control the bottom driver so as to raise the back bottom segment and control the head-side lift unit and/or the foot-side lift unit so as to tilt the top frame such that a head-side height of the top frame is higher than a foot-side height of the top frame;
wherein the height difference is calculated after a completion of the control in response to the tilt and back-raising command, whereby after completion of the control in response to the tilt and back-raising command the error correcting portion waits to correct the error until the bottom driver is restarted after stopping the bottom driver.

2. The bed apparatus according to claim 1, wherein the error threshold is set based on an operational input from the user or a state of the bed apparatus.

3. The bed apparatus according to claim 1, wherein the first driver is a first actuator,
the second driver is a second actuator, and
the state detector calculates the calculated bed state value based on a rod state of the first actuator and a rod state of the second actuator.

4. The bed apparatus according to claim 2, wherein the first driver is a first actuator,
the second driver is a second actuator, and
the state detector calculates the calculated bed state value based on a rod state of the first actuator and a rod state of the second actuator.

5. The bed apparatus according to claim 1, wherein the height difference is calculated in a situation that the first driver and the second driver stop.

6. The bed apparatus according to claim 5, wherein the height difference is calculated in response to the first driver and the second driver being stopped.

7. The bed apparatus according to claim 1, wherein the error threshold is the value that can be permitted as the error from a designated bed state value, and the designated bed state value is based on a non-zero difference between a predetermined height of the head-side lift unit and a predetermined height of the foot-side lift unit, whereby a predetermined angle of the top frame relative to a horizontal position of the top frame is non-zero.

8. The bed apparatus according to claim 1, further comprising:
a user input portion for receiving a user input that initiates the tilt and back-raising command.

9. The bed apparatus according to claim 1, wherein the tilt and back-raising command is based on a user input indicating a desired difference between a predetermined height of the head-side lift unit and a predetermined height of the foot-side lift unit;

wherein the height difference is calculated as the calculated bed state value in response to the completion of the control in response to the tilt and back-raising command;

wherein the error threshold is a value that can be permitted as an error from a designated bed state value, wherein the designated bed state value is based on the user input indicating the desired difference between the predetermined height of the head-side lift unit and the predetermined height of the foot-side lift unit; and whereby the error correcting portion is configured to correct the error in response to the calculated bed state value exceeding the error threshold, when the calculated bed state value exceeds the error threshold as a result of tilting of the top frame in response to the tilt and back-raising command.

10. The bed apparatus according to claim 2, wherein the error threshold is based on the operational input from the user.

* * * * *